(12) United States Patent
Eskicioglu

(10) Patent No.: US 7,636,846 B1
(45) Date of Patent: Dec. 22, 2009

(54) GLOBAL CONDITIONAL ACCESS SYSTEM FOR BROADCAST SERVICES

(75) Inventor: Ahmet Mursit Eskicioglu, Indianapolis, IN (US)

(73) Assignee: UQE LLC, Novato, CA (US)

( * ) Notice: Subject to any disclaimer, the term of this patent is extended or adjusted under 35 U.S.C. 154(b) by 0 days.

(21) Appl. No.: 09/445,133

(22) PCT Filed: Jun. 5, 1998

(86) PCT No.: PCT/US98/11634

§ 371 (c)(1),
(2), (4) Date: Mar. 13, 2000

(87) PCT Pub. No.: WO98/56180

PCT Pub. Date: Dec. 10, 1998

(51) Int. Cl.
*H04L 9/32* (2006.01)

(52) U.S. Cl. .............................. 713/176; 726/9; 726/10; 380/228

(58) Field of Classification Search ................. 713/182, 713/171, 176, 168, 160; 725/31, 6, 25, 26, 725/27, 28, 29, 30, 60; 705/50; 380/211, 380/212, 234, 241
See application file for complete search history.

(56) References Cited

U.S. PATENT DOCUMENTS

| | | | | |
|---|---|---|---|---|
| 5,237,610 A | * | 8/1993 | Gammie et al. ............. | 380/228 |
| 5,592,549 A | * | 1/1997 | Nagel et al. ................. | 705/52 |
| 5,592,551 A | | 1/1997 | Lett et al. | |
| 5,600,364 A | * | 2/1997 | Hendricks et al. .............. | 725/9 |
| 5,742,677 A | * | 4/1998 | Pinder et al. ................. | 380/242 |
| 5,884,284 A | * | 3/1999 | Peters et al. ................... | 705/30 |
| 5,894,320 A | * | 4/1999 | Vancelette .................. | 725/138 |
| 6,021,491 A | * | 2/2000 | Renaud ....................... | 713/179 |
| 6,105,134 A | * | 8/2000 | Pinder et al. ................. | 713/170 |
| 6,252,964 B1 | * | 6/2001 | Wasilewski et al. ......... | 380/282 |
| 6,571,337 B1 | * | 5/2003 | Xiao ........................... | 713/194 |

FOREIGN PATENT DOCUMENTS

EP 0506435 3/1992

(Continued)

OTHER PUBLICATIONS

Kaplan, IBM Cryptolopes, Super Distribution and Digital Rights Management, 1996, http://www.research.ibm.com, pp. 1-10.*

(Continued)

*Primary Examiner*—Kimyen Vu
*Assistant Examiner*—Yogesh Paliwal
(74) *Attorney, Agent, or Firm*—Stephen B Salai, Esq.; Michael J. Didas, Esq.; Harter Secrest & Emery LLP

(57) ABSTRACT

A method for managing access to a scrambled event, selected from an electronic program guide, of a service provider (including broadcast television networks, cable television networks, digital satellite systems, and internet service providers). Access to the event is only achieved if the descrambling key is obtained from a digitally signed message associated with the event in the electronic program guide. Authentication of the electronic program guide provider involves decrypting the digital signature using a public key of the guide provider.

20 Claims, 4 Drawing Sheets

FOREIGN PATENT DOCUMENTS

| | | |
|---|---|---|
| EP | 0585833 | 3/1994 |
| EP | 0719045 | 6/1996 |
| EP | 719045 A2 | 6/1996 |
| JP | 08-288904 | 11/1996 |
| JP | 09-083888 | 3/1997 |

OTHER PUBLICATIONS

Schneier, Applied Cryptography, 1996, John Wiley, p. 176.*

Macq, B.M.; Quisquater, J.-J., "Cryptology for digital TV broadcasting," Proceedings of the IEEE, vol. 83, No. 6, pp. 944-957, Jun. 1995.*

Schooneveld Van D.: "Standardization of Conditional Access Systems for Digital Pay Television" Philips Journal of Research, vol. 50, No. 1/ Jul. 2, 1996 pp. 217-225.

PCT Search Report dated Sep. 4, 1998.

* cited by examiner

GLOBAL CONDITIONAL ACCESS SYSTEM FOR BROADCAST SERVICES

FIELD OF THE INVENTION

This invention concerns a system for providing conditional access (i.e., managing access) to a consumer electronic device, such as a set-top box or a digital television, that is capable of receiving broadcast digital streams from a variety of sources, such as, broadcast television networks, cable television networks, digital satellite systems, internet service providers and sources of electronic list of events.

BACKGROUND OF THE INVENTION

Today, as depicted in FIG. 1, a user may receive services from a variety of service providers, such as broadcast television networks 22, cable television networks 24, digital satellite systems 26, and internet service providers 28. System 10 of FIG. 1 defines the present configuration for receiving services from such service providers. Most television receivers 12 are capable of receiving unscrambled, information or programs directly from broadcast and cable networks. Cable networks providing scrambled or encrypted programs usually require a separate stand-alone device 16*a*, 16*b* (e.g., a set-top box) to descramble or decrypt the program. Similarly, digital satellite systems usually provide scrambled or encrypted programs that also require the use of a separate set-top box. These set-top boxes may utilize a removable smart card 18*a*, 18*b* which contain the necessary decrypting algorithms and keys. Typically, a separate set-top box is required for each service provider. Connections to the internet or world-wide web (web) are usually handled via a personal computer 14, or the like, and a modem 20. Traditionally, access to the internet is managed using a specially designed software package loaded onto the computer; this software enables a user to connect to an internet service provider who acts as the gate keeper to the web. The user typically pays a monthly fee to the service provider for access to the internet, either on a limited or unlimited basis. As one would expect there are numerous service providers, each which requires specialized software for access.

SUMMARY OF THE INVENTION

The manufacturers of these digital televisions and set-top boxes may desire that they be compensated by the service provider for each connection to the service emanating from the box. Thus, the flexibility of open hardware architecture of the televisions and the set-top boxes in combination with a competitive market for such devices necessitates the need to provide a system for managing access so that the manufacturer is compensated for any use of its hardware to access any selected service provider. This invention resides, in part, in recognition of the described problem and, in part, in providing a solution to the problem.

An event or program as described herein comprises one of the following: (1) audio/visual data such as a movie, weekly "television" show or a documentary; (2) textual data such as an electronic magazine, paper, or weather news; (3) computer software; (4) binary data such as images or (5) HTML data (e.g., web pages). These service providers include any provider broadcasting events, for example, traditional broadcast television networks, cable networks, digital satellite networks, providers of electronic list of events, such as electronic program guide providers, and in certain cases internet service providers.

Generally, the present invention defines a method for providing conditional access to a broadcast event from a service provider. That is, this method comprises receiving an electronic list of events, such as an electronic program guide, from a list provider, wherein the list has a digitally signed message corresponding to each event of the list or guide, the digitally signed message comprises a message encrypted using a second public key and a digital signature created using a first private key. The method further comprises selecting an event from the list; receiving the digitally signed message corresponding to the selected event; authenticating the list provider; decrypting the message using a second private key to obtain an event key; receiving the selected event which is scrambled using the event key; and descrambling the selected event using the event key to provide a descrambled event.

In accordance with one aspect of the present invention, the steps of decrypting the message, receiving the selected event, and descrambling the selected event are performed in a removable smart card coupled to the device wherein the second private key is stored in the smart card.

In accordance with another aspect of the present invention, the message comprises event information which can be decrypted using the second private key. The event information further being stored in the smart card having a card body with a plurality of terminals arranged on a surface of the card body in accordance with one of ISO standard 7816 or PCMCIA card standards.

In accordance with yet another aspect of the present invention, a system for managing conditional access between a service provider and a device having a smart card coupled thereto, the device performing the steps of: receiving an electronic program guide having a digitally signed message corresponding to each event in the guide wherein each digitally signed message comprises a message encrypted using a smart card public key and a digital signature created using a guide provider private key; selecting an event from the guide; receiving the digitally signed message corresponding to the selected event; authenticating the guide provider by decrypting the digital signature; passing the message to a smart card; decrypting the message to obtain event information and a symmetric key; storing the event information in the smart card and updating account information; receiving the selected event which is scrambled using the symmetric key; and descrambling the selected event using the symmetric key to generate a descrambled event.

In accordance with yet another aspect of the present invention, a system for managing access between a service provider and a device having a smart card coupled thereto, the device performing the steps of: receiving an electronic program guide having a digital certificate and a separate message corresponding to each event in the guide, each of the digital certificates being encrypted using a first guide private key, the separate messages being encrypted using a smart card public key and containing an associated signature created using a second guide private key; selecting an event from the guide; receiving the digital certificate, message and associated digital signature corresponding to the selected event; authenticating the guide provider; passing the message to a smart card; decrypting the message using a smart card private key to obtain event information and a symmetric key; storing the event information in the smart card and updating account information based on the event information; receiving the selected event wherein the selected event is scrambled using the symmetric key; and descrambling the selected event using the symmetric key to generate a descrambled event.

These and other aspects of the invention will be explained with reference to a preferred embodiment of the invention shown in the accompanying Drawings.

DETAILED DESCRIPTION OF THE DRAWING

The present invention provides a conditional access system which may be utilized to obtain services from one of a plurality of sources. The conditional access system when implemented within a set-top box permits the set-top box to authenticate the service provider before a broadcast event is purchased and uses a smart card for decrypting the encrypted event received from the service provider. Alternately, the functionality of the smart card may be embedded within the set-top box. Such a conditional access system may act as a toll bridge for access to services thereby permitting a mechanism for the manufacturer of the set-top box to collect fees based on use of its set-top box. Similarly, this invention may be implemented within a digital television; for simplicity, the below description of the invention will be directed towards an implementation using a set-top box and a smart card.

Figure 1:
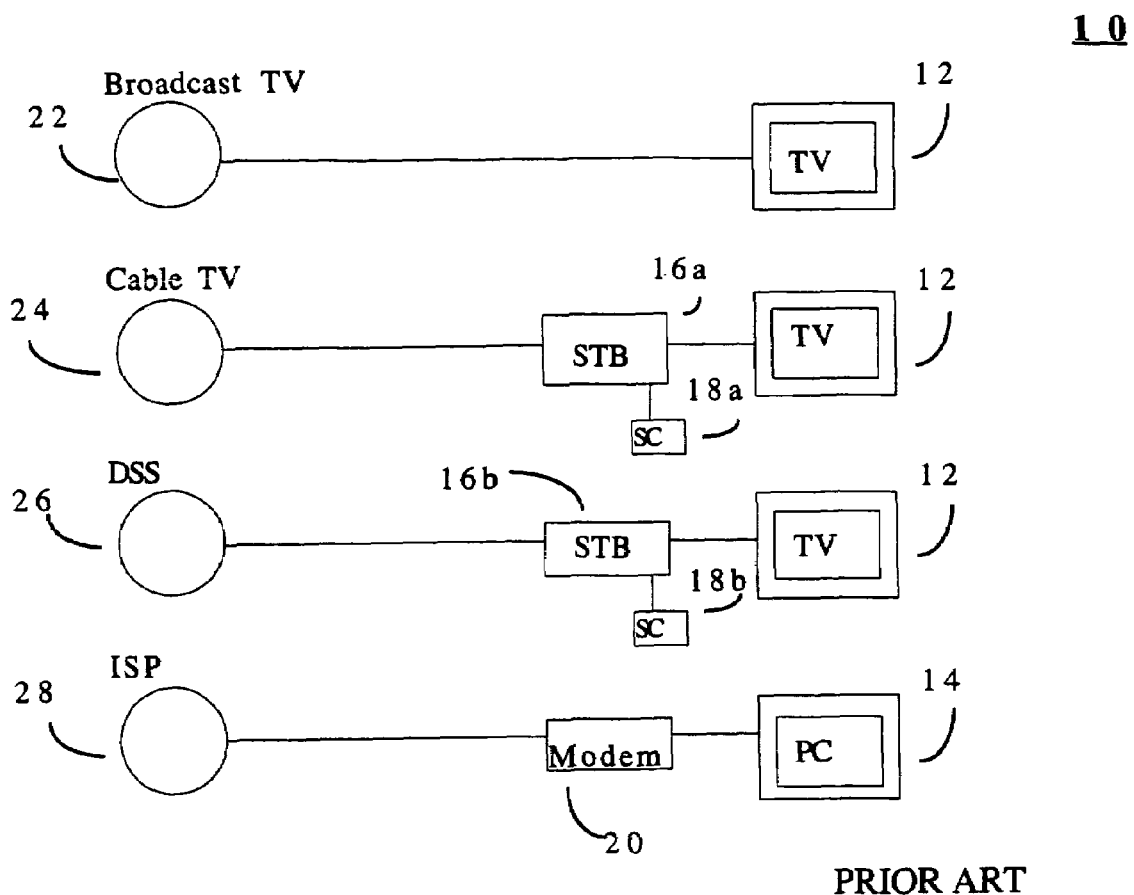
FIG. 1 is a block diagram illustrating a prior art configuration for interconnecting consumer electronic devices to a variety of service providers.
Figure 2:
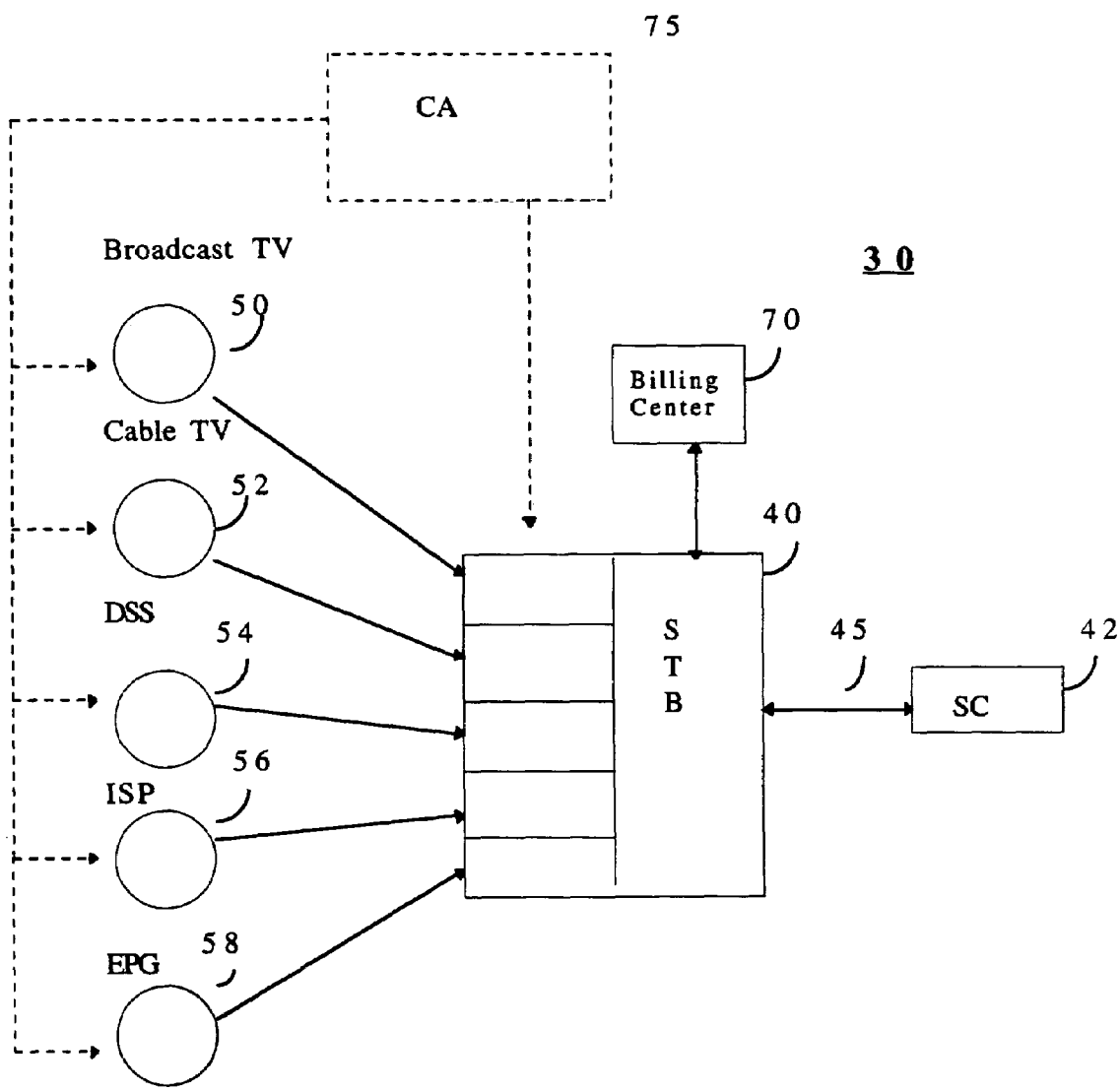
FIG. 2 is a block diagram illustrating one architecture for interfacing a common set-top box to a variety of service providers.

In FIG. 2, system 30 depicts the general architecture for managing access to a set-top box (STB) 40. Smart Card (SC) 42 is inserted into or coupled to a smart card reader (not shown) of STB 40; an internal bus 45 interconnects STB 40 and SC 42 thereby permitting the transfer of data therebetween. Such smart cards include ISO 7816 cards complying with National Renewable Security Standard (NRSS) Part A or PCMCIA cards complying with NRSS Part B. Conceptually, when such a smart card is coupled to a smart card reader, the functionality of the smart card may be considered to be a part of the functionality of the set-top box thus removing the "boundaries" created by the physical card body of the smart card.

STB 40 can receive services from a plurality of service providers (SPs), such as a broadcast television SP 50, a cable television SP 52, a satellite system SP 54, an internet SP 56, and an electronic event guide SP 58. Certificate authority (CA) 75 is not directly connected to either the service providers or STB 40 but issues digital certificates and public and private key pairs which are used as explained below. A set-top box public key is provided to the manufacturers of the devices and is stored therein before the product is shipped to the consumer. It is within the scope of this invention that the role of certificate authority 75 may be performed by the service providers in collaboration with the manufacturer of the STB 40. Billing system 70 is utilized to manage the user's accounts; updated information is provided as user's make arrangements to purchase additional services and as these services are consumed or used.

The general architecture of system 30 lends itself to achieving the goal of providing a vehicle for the manufacturer of the set-top box to collect a fee based on the consumer's use of the box to access an event. One adaptation of the general architecture would be to utilize a common conditional access and billing system encompassing all manufacturers and service providers. A problem with such an adaptation is that it may be difficult to obtain consensus amongst the various service providers and manufacturers of the set-top boxes. Another problem is that all the events would be encrypted using the public key of STB 40 and decrypted in SC 42 utilizing a stored private key of STB 40; thus if the private key were to be compromised the security of the entire system would collapse.

Figure 3:
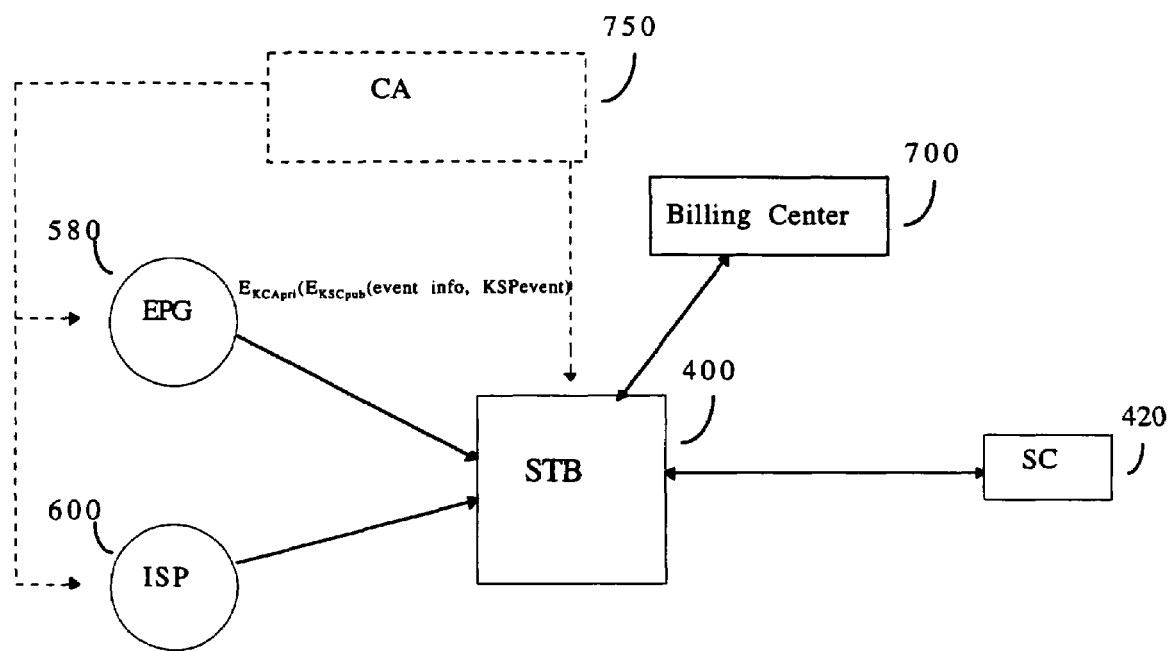
FIG. 3 is a block diagram of an exemplary implementation of a system for managing access to a device in accordance with the invention.

The conditional access system of the present invention, which overcomes the above problems, will be described in relation to system 300 as shown in FIG. 3. This conditional access system is based on authentication of the service provider communicating with STB 400 prior to purchasing a broadcast event from the service provider. In one embodiment of this conditional access system a combination of both an asymmetric key system (i.e., public-key system) and a symmetric key system is used. However, this invention is not limited to such an embodiment requiring symmetric keys as described below.

Symmetric key cryptography involves the use of the same algorithm and key for both encryption and decryption. The foundation of public-key cryptography is the use of two related keys, one public and one private. The private key is a secret key and it is computationally unfeasible to deduce the private key from the public key which is publicly available. Anyone with a public key can encrypt a message but only the person or device having the associated and predetermined private key can decrypt it. Similarly, a message can be encrypted by a private key and anyone with access to the public key can decrypt that message. Encrypting messages using a private key may be referred to as "signing" because anyone holding the public key can verify that the message was sent by the party having the private key. This may be thought of as being analogous to verifying a signature on a document.

A digitally signed message is a message sent in the clear (i.e., unencrypted) having a signature attached thereto. The attached signature is produced by encrypting either the message itself or a digest of the message; a digest of the message is obtained by hashing the message. (Hashing involves subjecting the message to a one-way hashing algorithm, such as MD5 developed by Ron Rivest or SHA-1 developed by the National Institute of Standards and Technology (NIST) and the National Security Agency (NSA) prior to encrypting the message.) Thus the recipient of the signed message can verify the source or origin of the message. (In comparison, a public key certificate or digital certificate is a message, containing a public key of the sending device, sent in the clear having a signature attached thereto.) Unilateral authentication of a service provider connected to the set-top box is achieved by passing such digitally signed messages between the service provider and the set-top box and verifying the signature. Signature verification involves checking the signature by decryption. Particularly, these messages contain at least information associated with the service provider passing the message or the selected event from the service provider and may contain the service provider's public key. These digitally signed messages, which may have signatures created by independent certificate authority 75, are stored by the service provider.

The following nomenclature will be utilized in the below description of the present conditional access system.

| | |
|---|---|
| KSCpub | SC's public key |
| KSCpri | SC's private key |
| KCApub | CA's Public Key used to verify signatures |
| KCApri | CA's Private Key used to create signatures |
| KSPevent | A service provider's event key |

Conditional access system 300 of FIG. 3 includes STB 400 having SC 420 coupled to a card reader (not shown); STB 400 communicates with billing center 700, a plurality of service providers (for simplicity, only one service provider, SP 600, is shown) and EPG 580. As discussed above, the functionality of SC 420 could be integrated into STB 400 and STB 400 could be a digital television. EPG 580 may be a separate service provider wherein electronic program guides containing listings of events from a plurality of service providers may be accessed. Alternately, EPG 580 may represent only a listing of events from a single service provider.

EPG 580 has a unique digitally signed and encrypted message associated with each event. This message is encrypted by KSCpub and is signed using KCApri, the private key that CA 750 assigned to EPG 580. The encrypted message may include information corresponding to the selected event and an event key, KSPevent.

After STB 400 is activated, SC 420 is coupled to a card reader of STB 400 (not shown), and in response to a user selecting a desired event from EPG 580, EPG 580 downloads the corresponding digitally signed message into STB 400. EPG 580 must be authenticated to ensure that the digitally signed message was received from the desired provider. This authentication involves decrypting the digital signature in STB 400 using KCApub. KCApub is the public key that CA 750 assigned to EPG 580 and is stored in STB 400. If EPG 580 is not authenticated, STB 400 provides an error indication to the user. Authentication of EPG 580 requires that a pre-existing agreement exists between the electronic guide provider source and the manufacturer of STB 400. This is because without such an agreement CA 750 would not provide KCApri to the source of electronic program guide.

After STB 400 authenticates EPG 580, the encrypted message is passed to SC 420 for decryption. SC 420 decrypts the message using KSCpri, which is stored therein, to obtain the data corresponding to the selected event and the event key. This data may include data relating to channel identity, date and time stamp, event identity, and payment amount. This data is stored in a memory device within SC 420 and is used to update the user account information. The updated account information can be passed to billing center 700 using signed messages.

The event key is retained within SC 420 thereby reducing the possibility of observing the key. The event key is used to descramble, in SC 420, the selected event received from the service provider; SC 420 provides a descrambled program to STB 400. Alternately, the event key could be passed back to STB 400 and used to descramble or decrypt the selected event in STB 400.

If the functionality of the smart card is embedded in the set-top box, the encrypted message would be decrypted within STB 400 and the event information would be stored within the set-top box. Similarly, the event key would remain in the set-top box and be used to descramble the selected event within STB 400.

Figure 4:
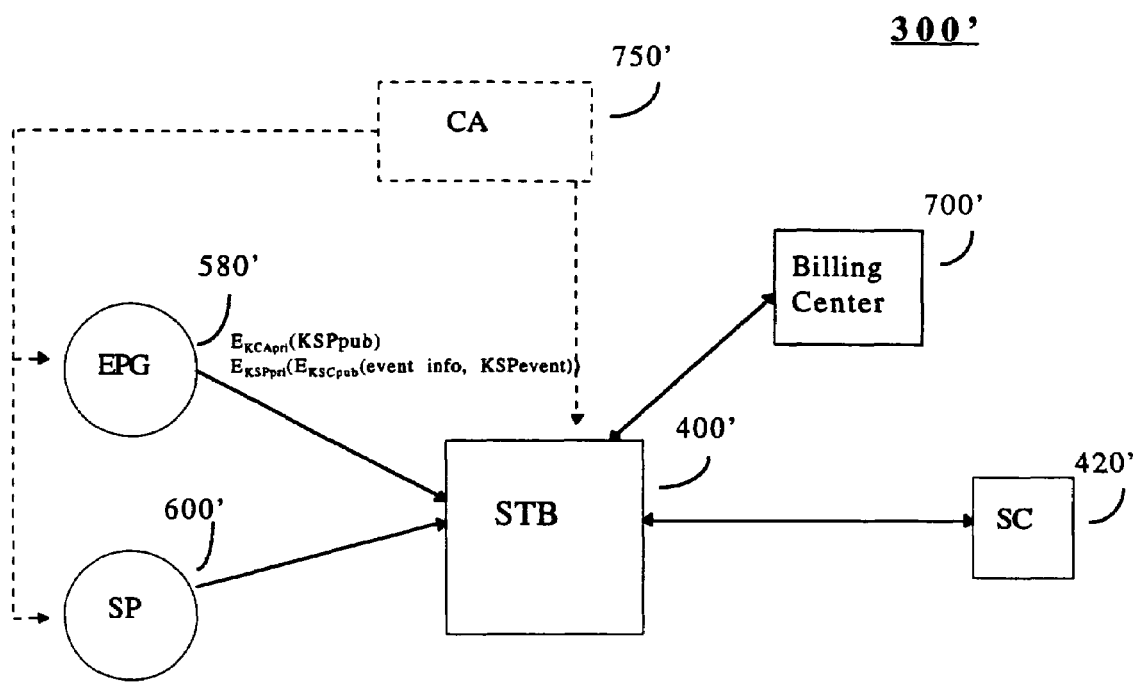
FIG. 4 is a block diagram of another exemplary implementation of the system of FIG. 3.

System 300', as depicted in FIG. 4, shows an alternative exemplary embodiment of the present invention wherein a certification hierarchy may be employed to avoid the certificate authority "signing" every message sent by a service provider. Certificate authority 750' generates a digital certificate for the public key of the service provider. The service provider, then in turn, would generate digitally signed messages using the corresponding private key of the service provider. That is, in response to a user selecting a desired event from EPG 580', EPG 580' downloads a digital certificate and a digitally signed message into STB 400'. The digital certificate is encrypted using KCApri and contains the service provider's public key, KSPpub. The digitally signed message is encrypted by the public key of SC 420', KSCpub, and is signed using the service provider's private key, KSPpri. The encrypted message may include information or data corresponding to the selected event and an event key, KSPevent.

In the same manner as for EPG 580 in the embodiment in FIG. 3, EPG 580' must be authenticated. This authentication involves decrypting the digital certificate in STB 400' using KCApub, which is stored therein to obtain KSPpub, and decrypting the digitally signed message in STB 400' using KSPpub.

In another embodiment of the present invention, each unique digitally signed message corresponding to an event listed in the electronic program guide would have an associated encrypted message. This encrypted message would only contain information related to the event, that is, the event key would not be included. In such an embodiment, public key cryptography may be used to encrypt the broadcast event. The electronic program guide must still be authenticated in STB 400 as described above. However, the decrypted message only contains information corresponding to the selected event. This information is stored and must be used by SC 420 to determine the private key for decrypting the event. In this embodiment utilizing public key cryptography, key transport is not needed.

The present invention has been described in terms of exemplary embodiments in which a single smart card cooperates with a single set-top box to manage access to a single service provider. However, it is within the scope of this invention to provide a conditional access system which may be extended to permit the smart card to "roam" across (i.e., provide conditional access between) multiple service providers and multiple manufacturers of the set-top boxes.

The robustness of the defined system may be increased by encrypting portions of the event with different keys included in the broadcast stream. These keys may be protected using the symmetric key received from the electronic program source.

While the invention has been described in detail with respect to numerous embodiments thereof, it will be apparent that upon reading and understanding of the foregoing, numerous alterations to the described embodiment will occur to those skilled in the art and it is intended to include such alterations within the scope of the appended claims.

The invention claimed is:

1. A method for managing access to a scrambled event of a service provider, said method comprising:

receiving in a device an electronic list of events available from one or more sources, each event having a digital signature and an encrypted message associated therewith;

receiving in the device, in response to user selection of one of the events from the list of events, the digital signature and the encrypted message associated with the selected event, the digital signature being encrypted with a first key and the encrypted message being encrypted with a second key different from the first key, the encrypted message comprising a descrambling key and event information including at least one of a channel identity, date and time stamp, event identity and payment amount corresponding to the selected event;

authenticating in the device a source of the digital signature and the encrypted message associated with the selected event by decrypting the digital signature in response to receiving the digital signature and the encrypted message;

decrypting in the device the encrypted message to obtain the descrambling key upon the authenticating;

receiving in the device the selected event from the service provider, the selected event being scrambled using the descrambling key for preventing unauthorized access to the selected event; and descrambling in the device the selected event using the descrambling key.

2. The method of claim 1 wherein the device comprises a smart card and the steps of decrypting the message, receiving the selected event, and descrambling the selected event are performed in the smart card, and wherein the second key is a first public key associated with the smart card and the step of decrypting uses a first private key associated with and stored in the smart card.

3. The method of claim 2 wherein the message further comprises event information, the event information being decrypted using the private key.

4. The method of claim 3 further comprising the step of storing the event information, wherein the step of storing the event information is performed in the device.

5. The method of claim 3 further comprising the step of storing the event information, wherein the step of storing the event information is performed in the smart card.

6. The method of claim 5 wherein the event information comprises channel identification data, event identity data, date and time stamp data, and billing data.

7. The method of claim 5 wherein the event information is used within the device to update a user's account information.

8. The method of claim 7 wherein the event information is downloaded to an independent billing center to update the user's account information.

9. The method of claim 5 wherein the smart card has a card body having a plurality of terminals arranged on a surface of the card body in accordance with one of ISO 7816 and PCM-CIA card standards.

10. The method of claim 9 further comprising authenticating the list of events to verify the origin of the message.

11. The method of claim 5 wherein the first key is a second private key and the step of authenticating comprises decrypting the digital signature using a second public key that is stored in the device.

12. The method of claim 11 wherein the digital signature, the second public key and the second private key are issued by an independent certificate authority and are associated with the list provider.

13. The method of claim 12 wherein the device is a digital television.

14. The method of claim 12 wherein the device is a set-top box.

15. A method for managing access between a device having a smart card coupled thereto and a service provider, the device performing the steps of:

receiving an electronic program guide having a plurality of events from a guide provider, the guide having a message and a digital signature associated with each event in the guide, the message being encrypted using a public key of the smart card and the digital signature being created using a private key of the guide provider;

selecting an event from the guide;

receiving the encrypted message and the digital signature corresponding to the selected event;

authenticating the guide provider by decrypting the digital signature using a public key of the guide provider, the guide provider public key being stored in the device;

passing the message to the smart card;

decrypting, in the smart card, the message using a private key of the smart card to obtain event information and a symmetric key, the smart card private key being stored within the smart card;

storing the event information in the smart card and updating account information based on the event information;

receiving from the service provider the selected event, the selected event being scrambled using the symmetric key; and descrambling, in the smart card, the selected event using the symmetric key to generate a descrambled event.

16. The method of claim 15 wherein the device is a set-top box.

17. The method of claim 15 wherein the device is a digital television.

18. A method for managing access between a device having a smart card coupled thereto and a service provider, the device performing the steps of:

receiving an electronic program guide having a plurality of events from a guide provider, the guide having a digital certificate and a separate message corresponding to each event in the guide, each of said digital certificates being encrypted using a first private key of the guide, the separate message being encrypted using a public key of the smart card and having an associated digital signature created using a second private key of the guide;

selecting an event from the guide;

receiving the digital certificate, the message and the digital signature corresponding to the selected event;

authenticating the guide provider by decrypting the digital certificate using a first public key of the guide to obtain a second public key of the guide, and decrypting the digital signature using the second guide public key, said first guide public key being stored in the device;

passing the message to the smart card;

decrypting, in the smart card, the message using a private key of the smart card to obtain event information and a symmetric key, the smart card private key being stored within the smart card;

storing the event information in the smart card and updating account information based on the event information;

receiving from the service provider the selected event, the selected event being scrambled using the symmetric key; and descrambling, in the smart card, the selected event using the symmetric key to generate a descrambled event.

19. The method of claim 18 wherein the device is a set-top box.

20. The method of claim 18 wherein the device is a digital television.

* * * * *